US012687690B2

(12) United States Patent
Hendrix et al.

(10) Patent No.: US 12,687,690 B2
(45) Date of Patent: Jul. 21, 2026

(54) FIBER PANEL REPLICATOR SHELF

(71) Applicant: viaPhoton, Inc., Aurora, IL (US)

(72) Inventors: Walter Mark Hendrix, Dallas, TX (US); Nathan Eric Benton, Dallas, TX (US); Mark James Smrha, Chicago, IL (US); Wade James Womack, Allen, TX (US)

( * ) Notice: Subject to any disclaimer, the term of this patent is extended or adjusted under 35 U.S.C. 154(b) by 432 days.

(21) Appl. No.: 18/212,076

(22) Filed: Jun. 20, 2023

(65) Prior Publication Data

US 2023/0333343 A1 Oct. 19, 2023

Related U.S. Application Data

(63) Continuation-in-part of application No. 17/591,169, filed on Feb. 2, 2022, which is a continuation-in-part of application No. 17/308,729, filed on May 5, 2021, now Pat. No. 11,531,178, and a continuation-in-part of application No. 17/555,008, filed on Dec. 17, 2021, now Pat. No. 12,044,895.

(60) Provisional application No. 63/353,810, filed on Jun. 20, 2022, provisional application No. 63/021,562, filed on May 7, 2020, provisional application No. 63/038,405, filed on Jun. 12, 2020, provisional application No. 63/251,390, filed on Oct. 1, 2021, provisional application No. 63/127,379, filed on Dec. 18, 2020, provisional application No. 63/144,804, filed on Feb. 2, 2021.

(51) Int. Cl.
*G02B 6/00* (2006.01)
*G02B 6/44* (2006.01)

(52) U.S. Cl.
CPC ..... *G02B 6/44526* (2023.05); *G02B 6/44524* (2023.05); *G02B 6/4455* (2013.01); *G02B 6/4478* (2013.01)

(58) Field of Classification Search
CPC ............ G02B 6/44526; G02B 6/44524; G02B 6/4455; G02B 6/4478; G02B 6/3897; G02B 6/4452; G02B 6/00; H02G 3/0406
See application file for complete search history.

(56) References Cited

U.S. PATENT DOCUMENTS

| | | | | |
|---|---|---|---|---|
| 8,744,228 B2* | 6/2014 | Womack | ............ | G02B 6/44528 385/137 |
| 2018/0335595 A1* | 11/2018 | Takeuchi | .............. | H04Q 1/025 |
| 2019/0278039 A1* | 9/2019 | Geens | ................ | G02B 6/44528 |

* cited by examiner

*Primary Examiner* — Jennifer Doan
(74) *Attorney, Agent, or Firm* — Ferguson Braswell Fraser Kubasta PC

(57) ABSTRACT

Apparatus, systems, methods implement replicator shelves. A blade is slidably connected to a replicator shelf. Communication connectors are positioned on the blade. A support bar, within the replicator shelf, supports a plurality of cables to a plurality of blades comprising the blade.

20 Claims, 18 Drawing Sheets

REPLICATOR SHELF <u>100</u>

BLADES <u>102</u>

COMMUNICATION CONNECTORS <u>105</u>

CABLES <u>108</u>

SUPPORT BAR <u>110</u>

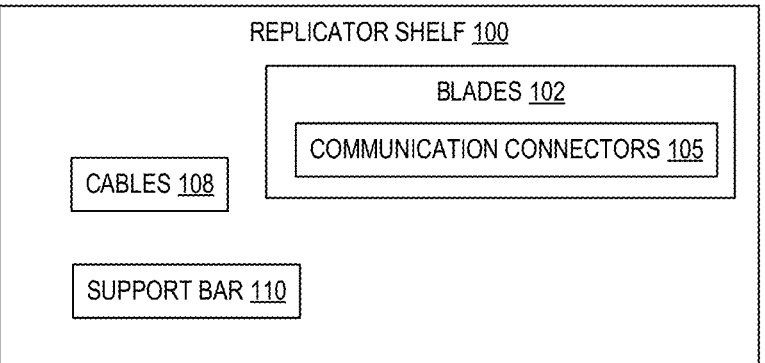
_FIGURE 1_

TRANSITION
HOLDER
B 502

ENTRY GUIDE
B 505

SUPPORT BAR
508

ENTRY GUIDE
A 325

RETAINING RINGS 512

HALF SPOOL GUIDES 510

RACEWAY 515

TRANSITION
HOLDER
A 315

BLADE 302

COMMUNICATION
CONNECTORS 305

SUPPORT
GUIDES 602

LONGITUDINAL PORTION 650

FLANGES 652

COMMUNICATION
CONNECTORS 305

BLADE 302

REPLICATOR SHELF 300

HALF SPOOL GUIDES 510

RACEWAY 515

CABLES C 318

RETRACTED POSITION 1108

BLADE 1102

CABLES 1117

SUPPORT BAR 1105

CABLE MANAGEMENT
STRUCTURES 1103

EXTENDED POSITION 1110

BLADE 1112

BLADE 1102

CABLES 1117

SUPPORT BAR 1105

CABLE MANAGEMENT
STRUCTURES 1103

FIBER PANEL REPLICATOR SHELF

CROSS-REFERENCE TO RELATED APPLICATIONS

This application claims priority from U.S. Provisional Application 63/353,810, filed Jun. 20, 2022. This application is a continuation in part of Ser. No. 17/591,169, filed Feb. 2, 2022. U.S. application Ser. No. 17/591,169 is a continuation in part of U.S. application Ser. No. 17/308,729, filed May 5, 2021. U.S. application Ser. No. 17/308,729 claims priority from U.S. Provisional Application 63/021, 562, filed May 7, 2020. U.S. application Ser. No. 17/308,729 claims priority from U.S. Provisional Application 63/038, 405, filed Jun. 12, 2020. U.S. application Ser. No. 17/591, 169 is a continuation in part of U.S. application Ser. No. 17/555,008, filed Dec. 17, 2021. U.S. application Ser. No. 17/555,008 claims priority from U.S. Provisional Application 63/251,390, filed Oct. 1, 2021. U.S. application Ser. No. 17/555,008 claims priority from U.S. Provisional Application 63/127,379, filed Dec. 18, 2020. U.S. application Ser. No. 17/591,169 claims priority from U.S. Provisional Application 63/127,379, filed Dec. 18, 2020. U.S. application Ser. No. 17/591,169 claims priority from U.S. Provisional Application 63/144,804, filed Feb. 2, 2021. Each of the applications identified above are herein incorporated by reference.

BACKGROUND

Network switches provide high-speed and reliable communication within a network infrastructure. These switches have ports that accommodate cables (including fiber optic cables), enabling the transmission of data using light signals or electrical signals. Network switches include ports that provide physical interfaces to connect devices. A challenge is the fragility of the performance of network switches when changing, adding, or testing the paths, cables, and connections with the ports of the network switch. Although physically robust, mistakes made in disconnecting and reconnecting cables to the ports of the network switch may cause substantial performance declines of the overall network.

SUMMARY

In general, in one or more aspects, the disclosure relates to apparatus, systems, and methods implementing replicator shelves. A blade is slidably connected to a replicator shelf. Communication connectors are positioned on the blade. A support bar, within the replicator shelf, supports a plurality of cables to a plurality of blades comprising the blade.

Other aspects of the invention will be apparent from the following description and the appended claims.

BRIEF DESCRIPTION OF DRAWINGS

FIG. 1 shows diagrams of systems in accordance with disclosed embodiments.

Like elements in the various figures are denoted by like reference numerals for consistency.

DETAILED DESCRIPTION

Figure 2:
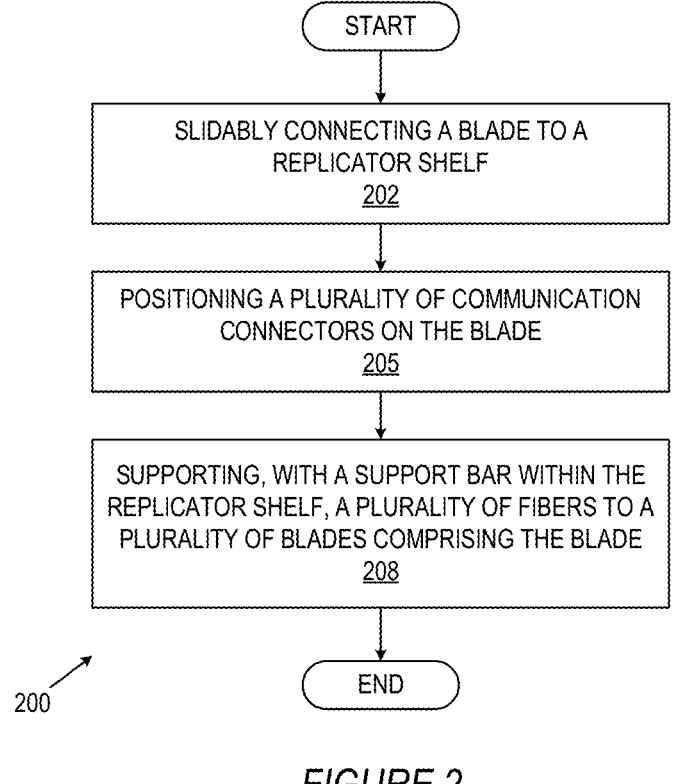
FIG. 2 shows a flowchart in accordance with disclosed embodiments.

Embodiments of the disclosure reduce the fragility of the performance of network switches when changing, adding, or testing the paths, cables (which may include optical fibers), and connections with the ports of the network switch by using a replicator shelf. The replicator shelf replicates the ports of a network switch to enable the port presentation on the network switch to be replicated on the replicator shelf. Replicating the ports of the network switch on the replicator shelf allows the changing, adding, or testing of the paths, cables, and connections of a network to be performed without touching or changing the actual connections on the ports of the network switch. By not touching the connections on the ports of the network switch, performance of the network may be maintained during maintenance, testing, and operation of the network switch.

Turning to FIG. 1, the replicator shelf (100) replicates the ports of a network switch. The replicator shelf (100) includes the blades (102), the cables (108), and the support bar (110).

The blades (102) includes the communication connectors (105), In one embodiment, the communication connectors (105) may be LC or other connectors for optical fibers and jacks.

The cables (108) extend into the replicator shelf (100). The cables (108) are connected to the communication connectors (105).

The support bar (110) supports the cables (108) within the replicator shelf (100). The support bar (110) prevents the cables (108) from snagging on components within the replicator shelf (100) and prevents violation of minimum fiber bend radius.

Turning to FIG. 2, the method (200) duplicates ports on a network switch. In one embodiment, the method forms at least part of a replicator shelf.

At Step 202, a blade is slidably connected to a replicator shelf. The connections may be with structures on an exterior of a housing of the replicator shelf to prevent snagging of cables within the replicator shelf.

At Step 205, communication connectors are positioned on the blade. In one embodiment, the connected may be snap fit to holes cut within a front of the blade.

At Step 208, fibers are support, with a support bar within the replicator shelf, to the blades of the replicator shelf. The support bar prevents the cables within the replicator shelf from snagging or getting caught on structures within the replicator shelf even during movement of the blades between retracted and extended positions.

Figure 3:
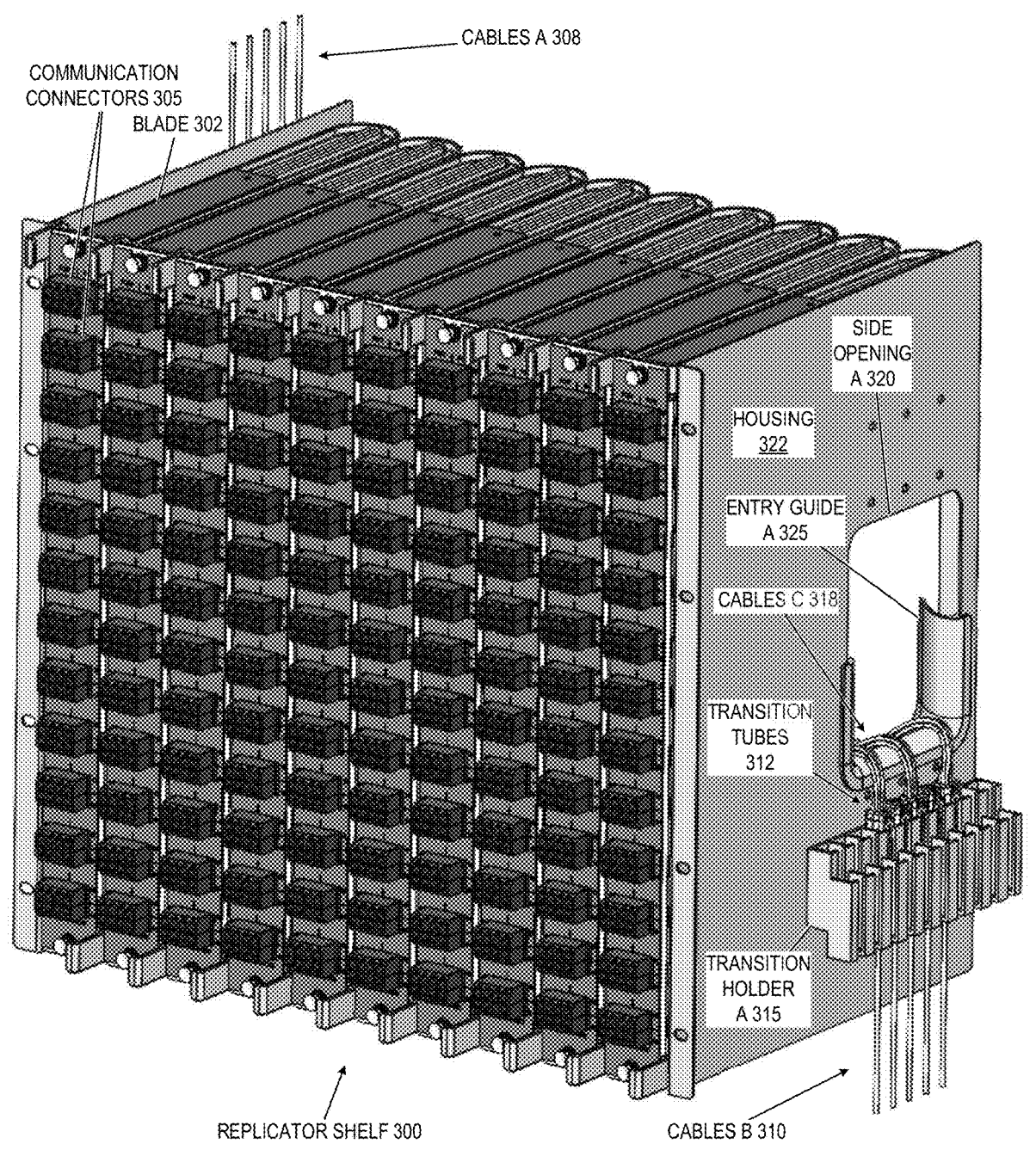
FIG. 3, FIG. 4, FIG. 5, FIG. 6A, FIG. 6B, FIG. 6C, FIG. 6D, FIG. 7, FIG. 8A, FIG. 8B, FIG. 8C, FIG. 9, FIG. 10A, FIG. 10B, FIG. 11A, and FIG. 11B show examples in accordance with disclosed embodiments.

Turning to FIG. 3, a perspective view of the front of the replicator shelf (300) is shown. The replicator shelf (300) may also be referred to as a port replication shelf or fiber panel replicator shelf. With the replicator shelf (300) connected to a network switch, a user may access the channels of the network switch without disturbing the network switch and corresponding physical connections. The ports on the front of the replicator shelf (300) replicate and extend the ports on the front of the network switch to which the replicator shelf (300) is connected. The replicator shelf (300) includes several components. The blade (302) slidably connected to the replicator shelf (300). Multiple communication connectors (305) are positioned on the blade (302).

The cables A (308) may approach the replicator shelf (300) from above the replicator shelf (300). For example, the cables A (308) may be routed through a ceiling of the data center in which the replicator shelf (300) is installed and down to the replicator shelf (300).

The blade (302) is one of multiple blades inserted into the replicator shelf (300). In one embodiment, the replicator shelf (300) includes slots for ten blades. Different numbers of slots may be used for blades and communication connectors with different thicknesses.

In one embodiment, the height of the replicator shelf (300) is ten rack units (10RU). In one embodiment, ten rack units measures to about 17.5 inches. In one embodiment, the ten rack unit height provides for twelve communication connectors to be exposed along a front of the blade (302).

In one embodiment, the width of the replicator shelf (300) is about nineteen inches. Different widths may be used to accommodate placement of replicator shelves into racks of different widths. Replicator shelves of different widths may have different numbers of blades within the shelf.

The cables B (310) may approach the replicator shelf (300) from below the replicator shelf (300). For example, the cables B (310) may be routed via a floor of the data center in which the replicator shelf (300) is installed and up to the replicator shelf (300). The cables B (310) are routed to the transition tubes (312), which are affixed to the transition holder A (315). The cables C (318) extend from the transition tubes (312) through the side opening A (320) into the housing (322) of the replicator shelf (300) over the entry guide A (325).

Figure 4:
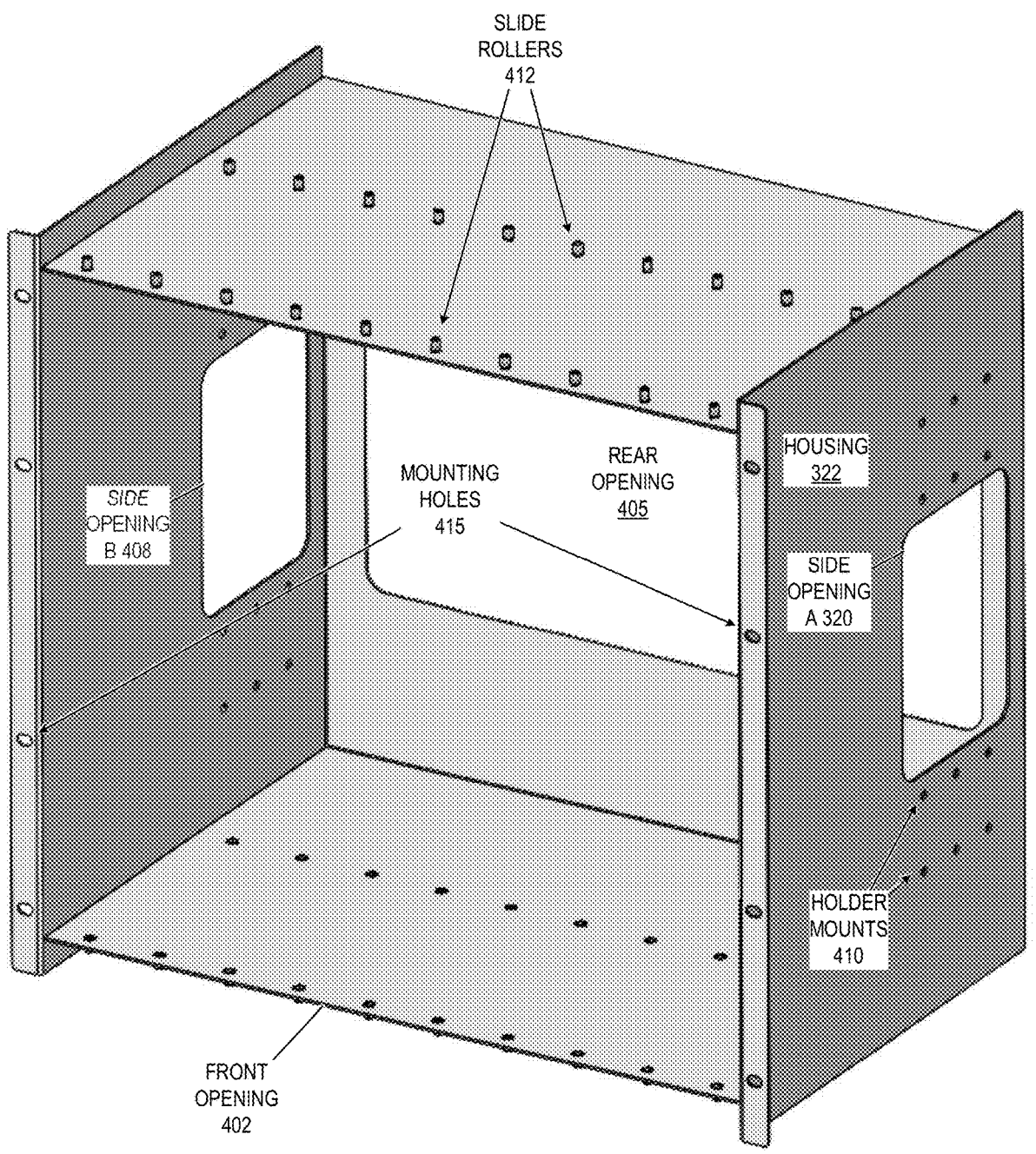

Turning to FIG. 4, the housing (322) of a replicator shelf is illustrated in a perspective view. The housing (322) includes the front opening (402), the rear opening (405), the side opening A (320), and the side opening B (408). The front opening (402) allows for the placement of blades into the housing (322). The side opening A (320) and the side opening B (408) allow for passage of cables from outside the housing (322) to inside the housing (322) and is structured to receive guides for cables, including the entry guide A (325) (of FIG. 3). The rear opening (405) provides access to the interior of the housing (322).

The housing (322) includes several mounting fixtures. The mounting fixtures include the holder mounts (410) to which the transition holder A (315) (of FIG. 3) may be connected. The mounting fixtures also include the sliding rollers (412) to which the slides of blades may be affixed. The mounting fixtures further include the mounting holes (415). In one embodiment, screws may be used in conjunction with the mounting holes (415) to affix the housing (322) to a rack. The housing (322) and the mounting fixtures of the housing (322) are designed to prevent the obstruction of the movement of cables within the housing (322) when sliding blades into and out of the housing (322).

Figure 5:
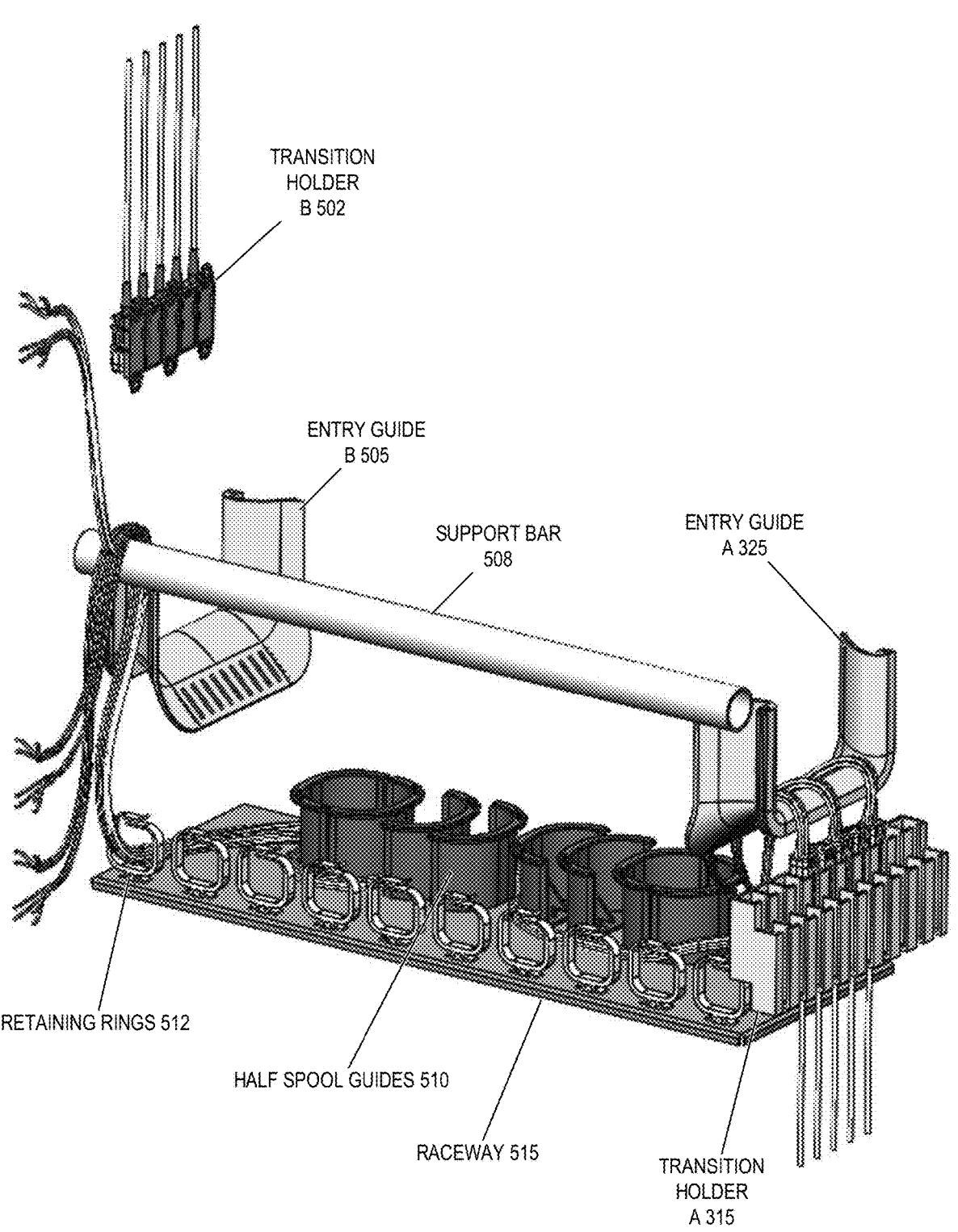

Turning to FIG. 5, cable management fixtures of the replicator shelf (300) (of FIG. 3) are illustrated. The cable management fixtures include the transition holders A (315) and B (502), the entry guides A (325) and B (505), the support bar (508), the half spool guides (510), the retaining rings (512), and the raceway (515).

The transition holders A (315) and B (502) fit to the sides of the housing (322) (of FIG. 4). In one embodiment, the transition holder A (315) includes space for ten transition tubes and the transition holder B (502) includes space for five transition tubes.

The entry guides A (325) and B (505) may be affixed to the bottom of the side openings A (320) and B (408) (of FIG. 4) and may be structured to fit to either the top or bottom of the side openings A (320) and B (408) (of FIG. 4). The entry guides A (325) and B (505) support cables entering the housing (322). In one embodiment, the entry guides A (325) and B (505) include a curvature with a radius greater than the minimum bend radius of the cables supported by the entry guides A (325) and B (505).

The support bar (508) extends between the sides of the housing (322) (of FIG. 4). The support bar (508) supports cables within the housing (322) (of FIG. 4) to prevent snags when the cables are moved and prevent fiber bend radius violations.

The half spool guides (510) are located in a bottom portion of the housing (322) (of FIG. 4). The half spool guides (510) are guides for wrapping excess slack of cables.

The retaining rings (512) are located in a bottom portion of the housing (322) (of FIG. 4). The retaining rings (512) may collect cables for one of the blade of the replicator shelf (300) (of FIG. 3).

The raceway (515) is a support structure that may be affixed to a bottom portion of the housing (322). The raceway 315 supports the half spool guides 310 and the retaining rings (512), which may be affixed to the raceway 315.

Figure 6A:
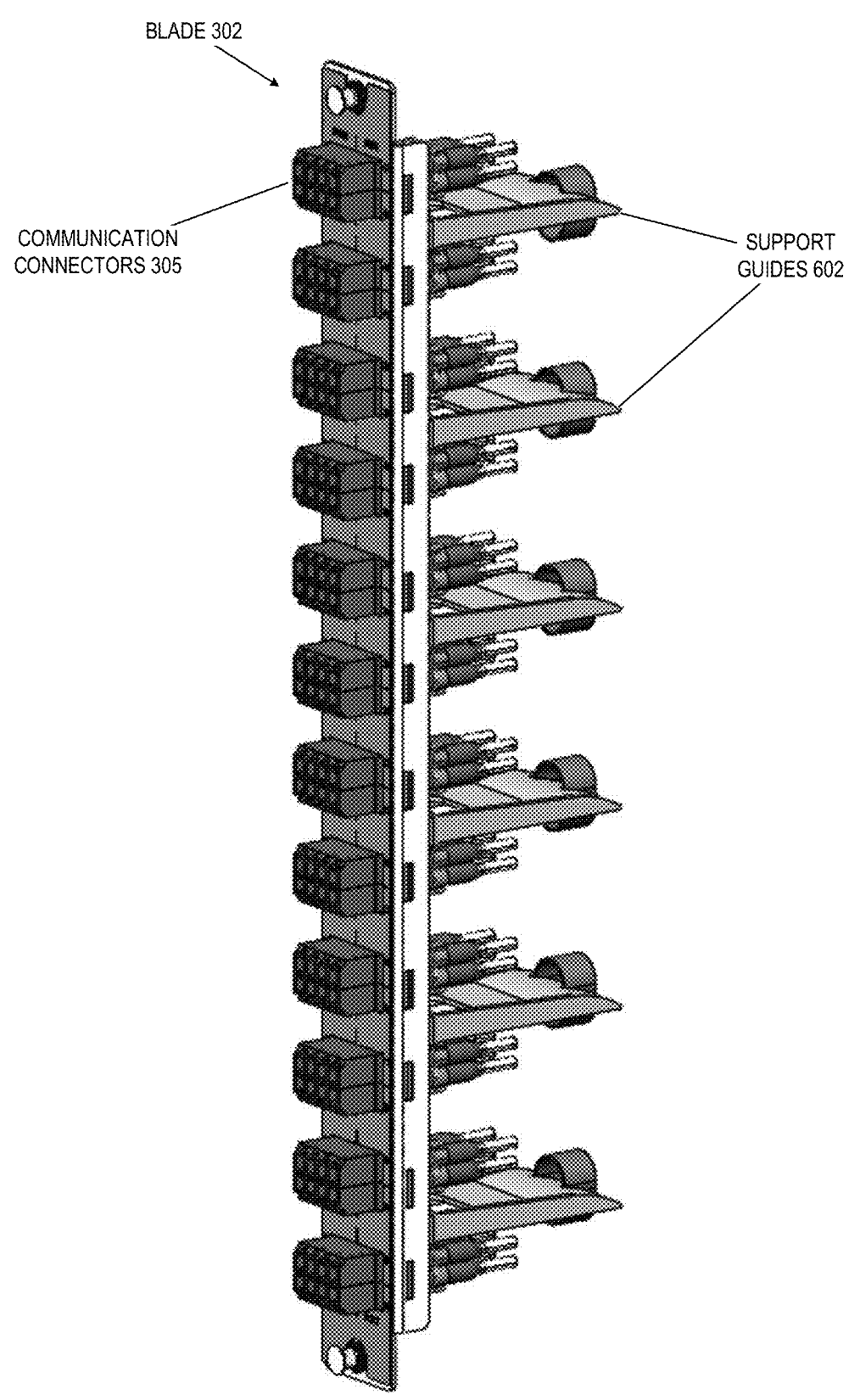

Turning to FIG. 6A, a portion of the blade (302) is illustrated. The blade (302) includes twelve communication connectors (305) and six support guides (602)

Figure 6B:
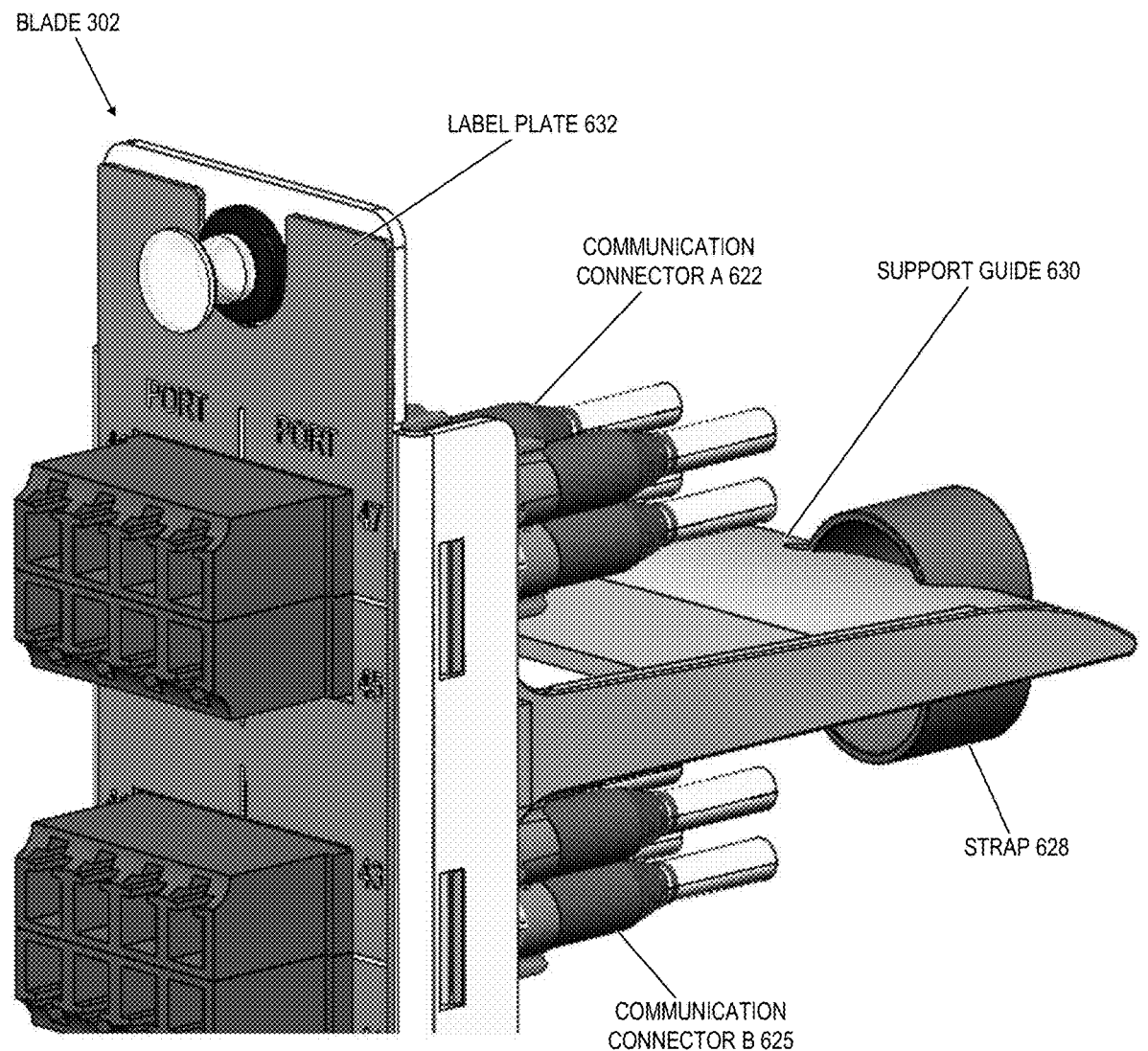

Turning to FIG. 6B, a front perspective view of a portion of the blade (302) is shown. The magnetically backed label plate (632) is affixed to the blade (302). In one embodiment, the label plate (632) includes labels for each of the ports on the front of the blade (302).

The support guide (630) of the blade (302) is positioned between the pair of communication connectors A (622) and B (625). The strap (628) is within the support guide (630) to secure a subset of cables to the support guide (630) between the support bar (508) (of FIG. 5) and the communication connectors A (622) and B (625).

In one embodiment, the communication connectors A (622) and B (625) are LC optical connectors. Different types of connectors may be used.

Figure 6C:
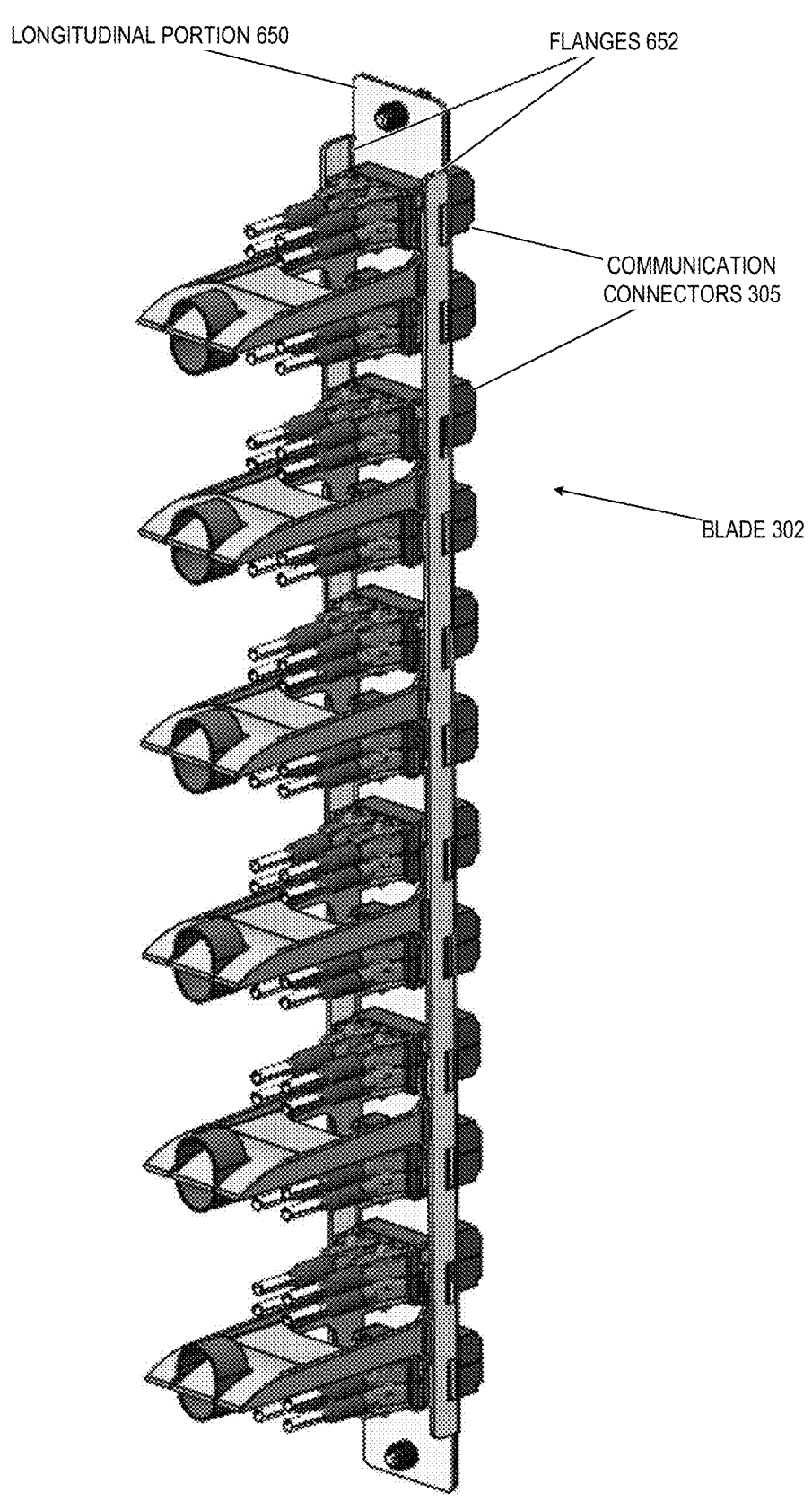

Turning to FIG. 6C, the blade (302) is shown from a rear perspective. The blade (302) includes the longitudinal portion (650) between the two flanges (652). In one embodiment, the longitudinal portion (650) and the flanges (652) are formed from a single piece of material (e.g., metal) that is folded to create the flanges (652). The longitudinal portion (650) includes cutouts to support the communication connectors (305).

Figure 6D:
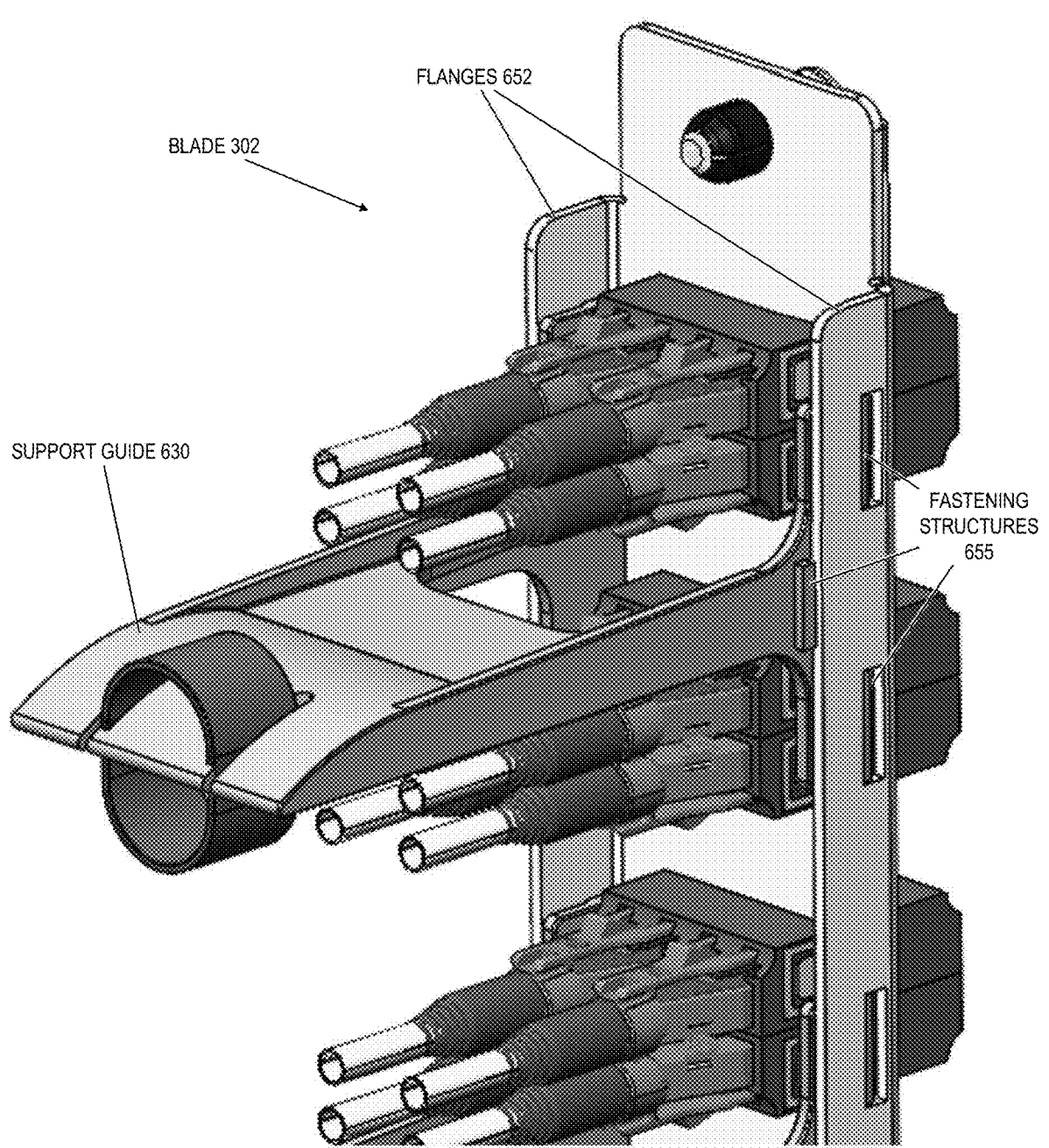

Turning to FIG. 6D, a rear perspective view of a portion of the blade (302) is shown. The support guide (630) extends between the two flanges (652) and includes multiple fastening features to fit and secure the support guide (630) to the flanges (652). The support guide (630) provides bend control and retention for the cables connected to the blade (302).

Figure 7:
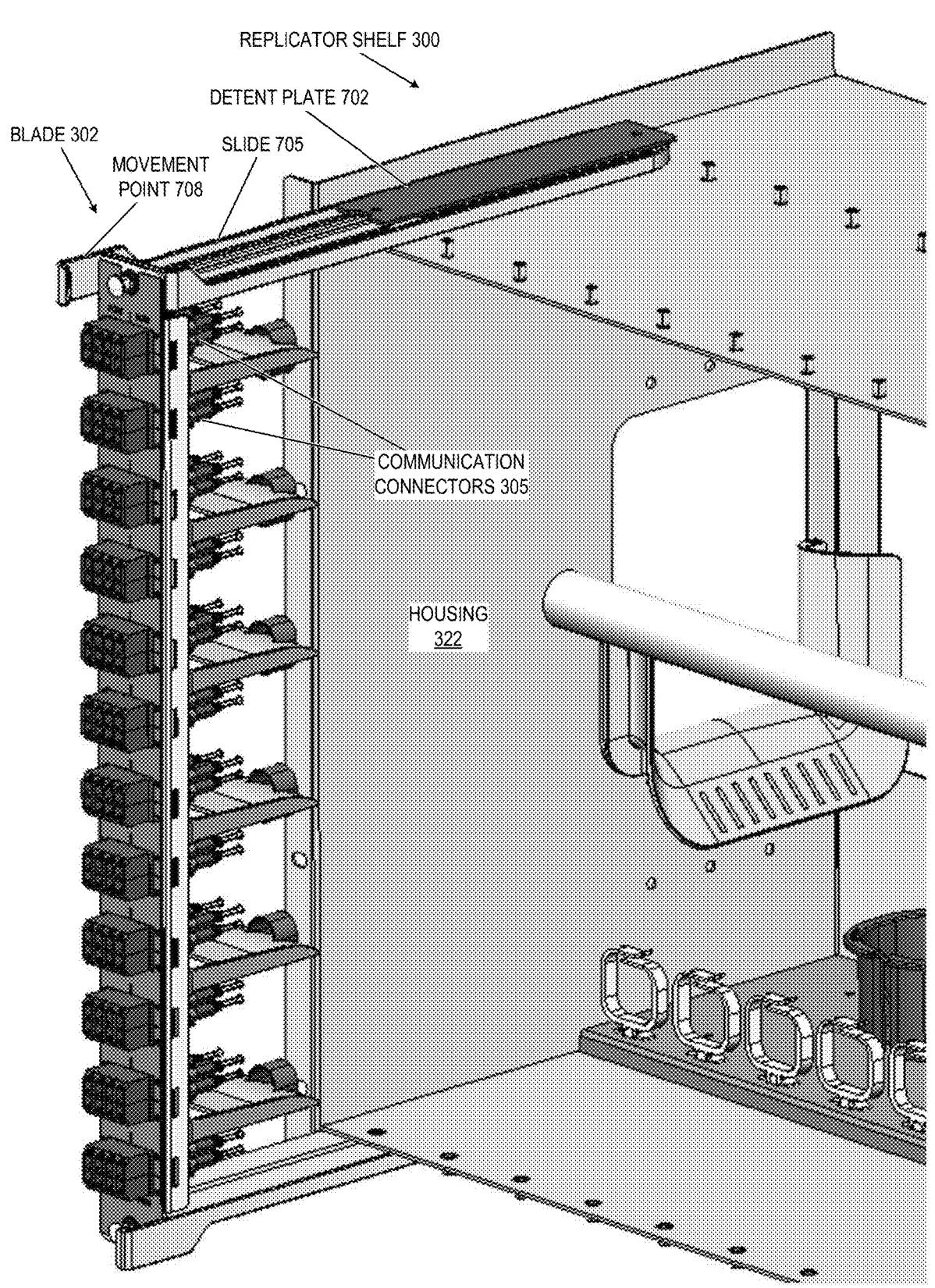

Turning to FIG. 7, a perspective view of components of the replicator shelf (300) are shown. A limiter of the detent plate (702) limits travel of the blade (302) with respect to the replicator shelf (300). For example, the detent plate (702) may be connected to two slide rollers affixed to the housing (322) of the replicator shelf (300) and the slide rollers may limit the travel distance of the blade (302). In one embodiment, the blade (302), or a portion thereof, may rotate to provide access to fibers or cables connected to the communication connectors (305).

The blade (302) includes the slide (705), which is limited in travel by slide rollers connected to the detent plate (702). The slide (705) includes the movement point (708), which a user may use to move the blade (302) with respect to the replicator shelf (300). The internal surface of the housing (322) is smooth to prevent damage or snags when the cables connected to the blade (302) move within the housing (322). The sliding mechanism for the blade (302) is external to the housing (322) to prevent damage or snags when the cables connected to the blade (302) move within the housing (322).

5

Figure 8A:
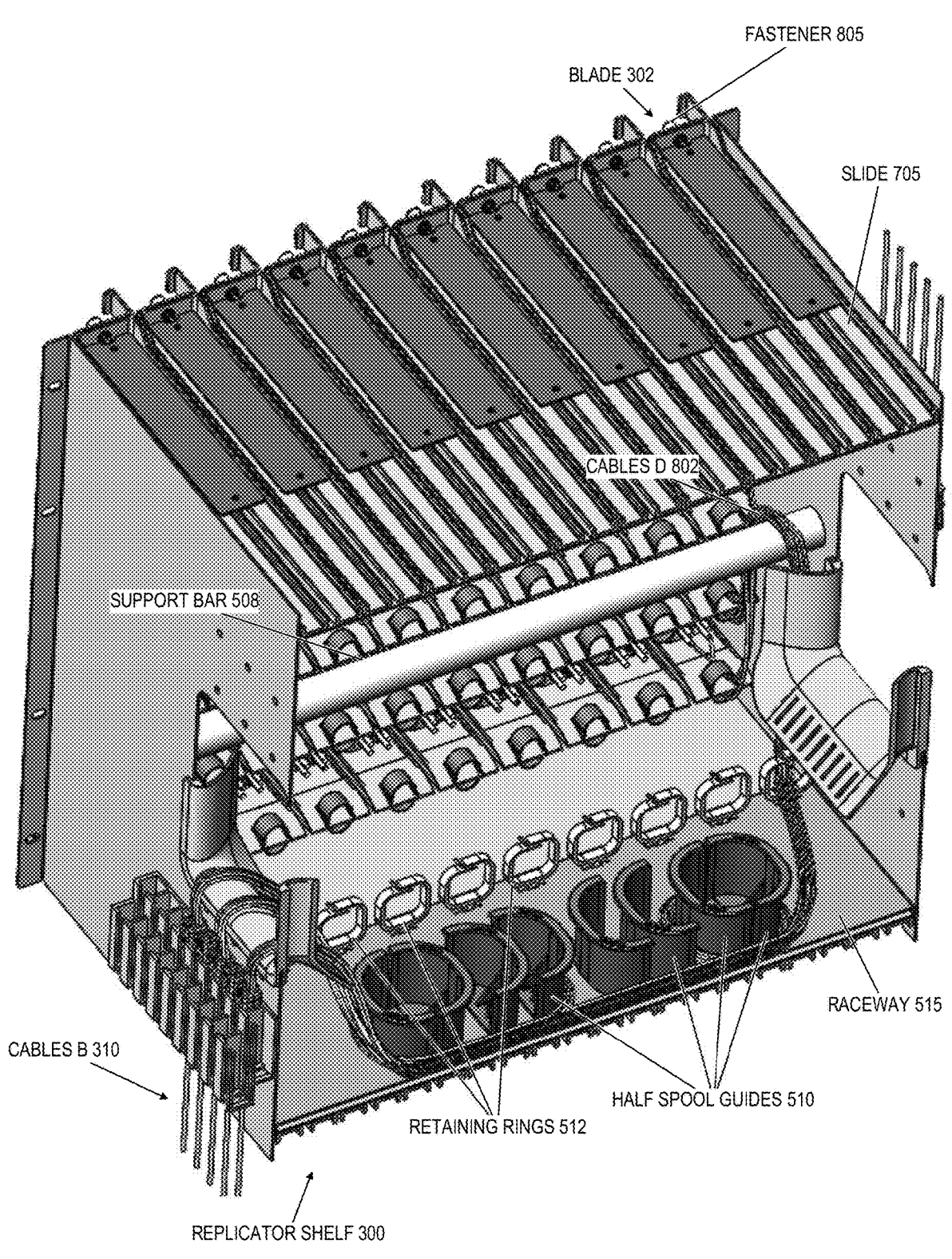

Turning to FIG. 8A, a perspective view of a rear of the replicator shelf (300) is shown with a rear portion of the replicator shelf (300) cut away for clarity. The support bar (508), within the replicator shelf (300), supports multiple cables D (802) to the blade (302). Additional fibers may be supported to other blades in the replicator shelf (300). The fastener (805) fastens the front of the blade (302) to the slide (705).

A method of routing communication lines (fibers, wires, cables, etc.) includes routing the cables B (310) into the replicator shelf (300) through the raceway (515), around the support bar (508), and to the connectors of the blade (302). The raceway (515) includes multiple half spool guides (510) to manage varying amounts of cable slack, and fiber management retaining rings (512) to segregate the fiber bundles of each blade (302). In one embodiment, the number of the retaining rings (512) is the same as the number of blades fitted to the replicator shelf (300).

Figure 8B:
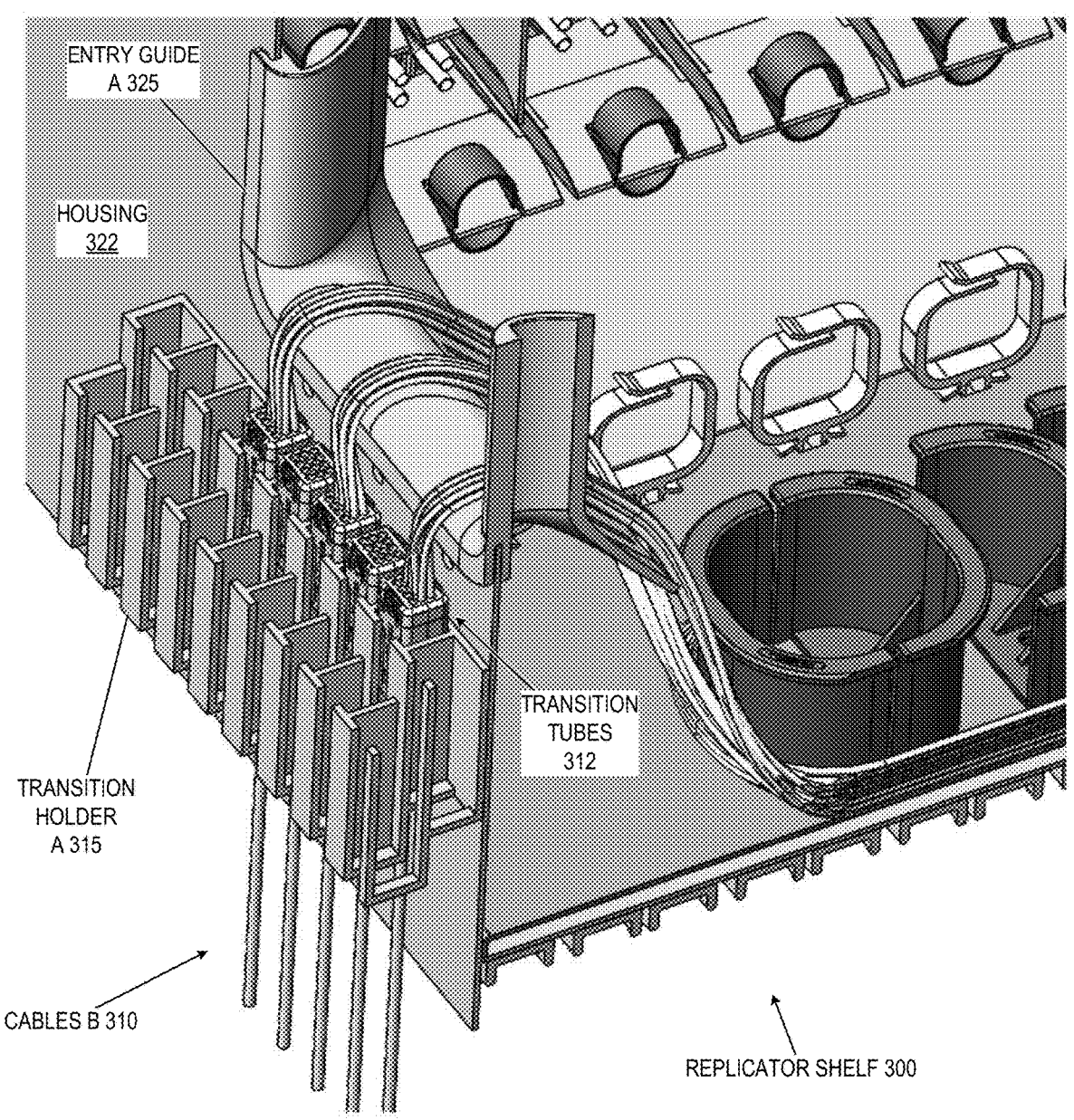

Turning to FIG. 8B, a zoomed perspective view of a rear of the replicator shelf (300) from FIG. 8A is shown. In one embodiment, the transition holder (315) is formed as an injection molded part and snaps to the housing (322). In one embodiment, the entry guide A (325) is formed as an injection molded part that slide fits to the housing (322). The transition tubes (312) (five of which are shown) may snap into the transition holder (315) to prevent damage from pulling down on the cables B (310).

Figure 8C:
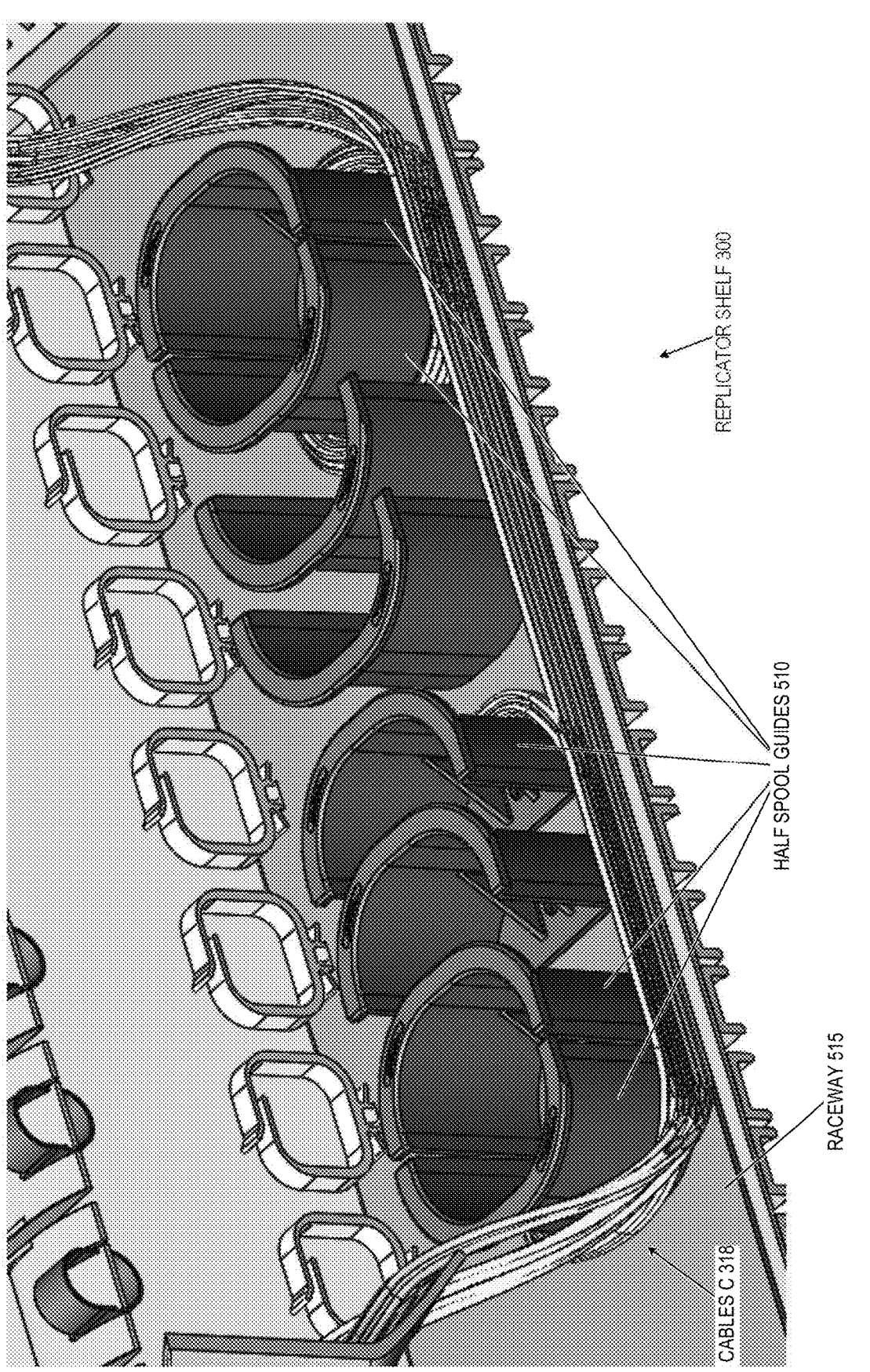

Turning to FIG. 8C, another zoomed perspective view of a rear of the replicator shelf (300) from FIG. 8A is shown. In one embodiment, the cables C (318) include fiber optic cables with two optical fibers within a furcation tube for each of the cables C (318). The cables C (318) come into the replicator shelf (300) lays on the raceway (515) and is wrapped around the half spool guides (510), which provide variable slack management. In one embodiment, support may be provided for 320×2 millimeter furcation tubes or 640 optical fibers per side of the replicator shelf (300). Including both sides, the replicator shelf (300) may support at least 1280 fibers. Different counts of fibers and cables may be used.

Figure 9:
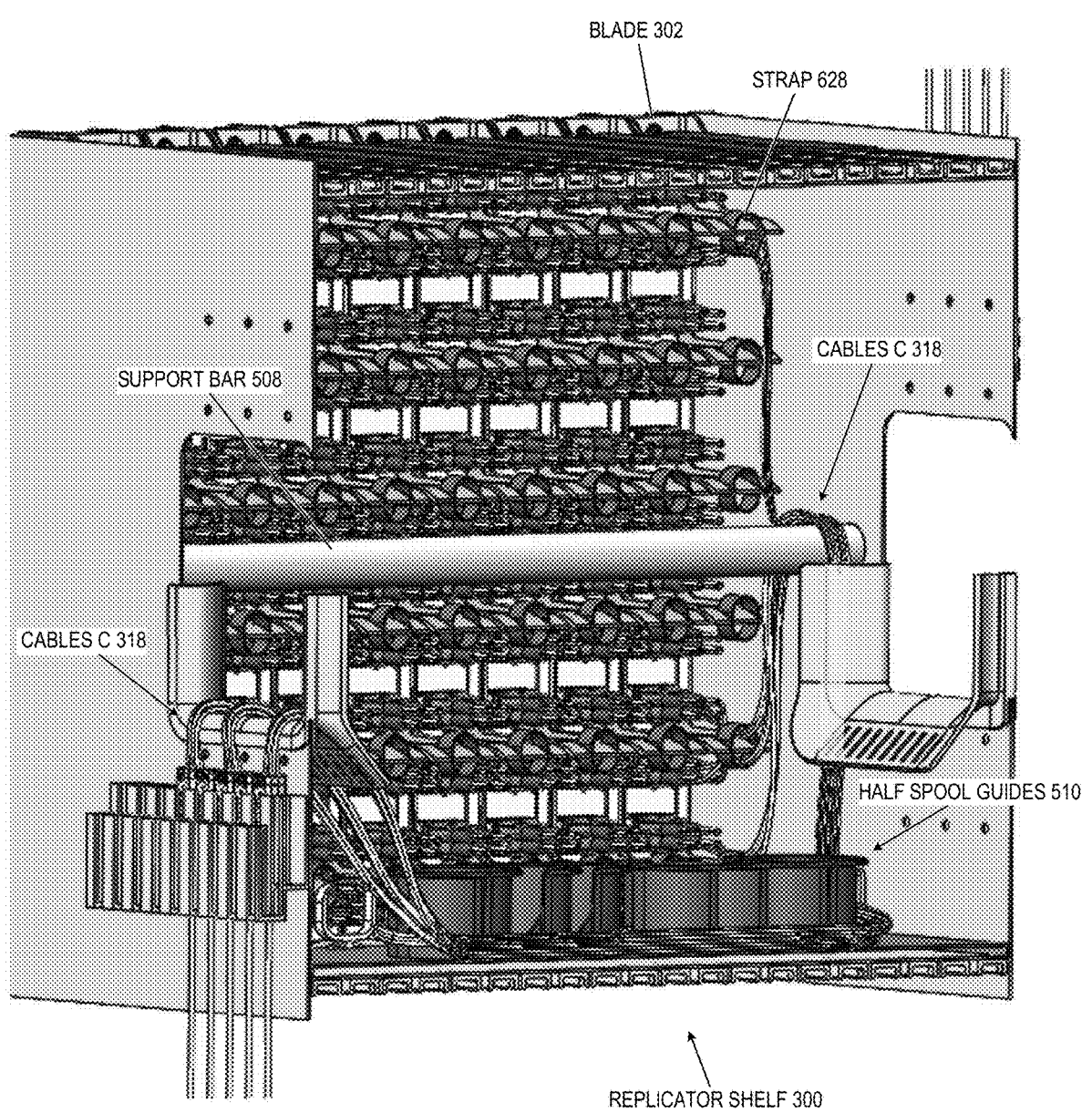

Turning to FIG. 9, another rear cutaway view of the replicator shelf (300) is shown. The cables C (318) wrap around the half spool guides (510), over the support bar (508) for support during movement, and through the strap (628) to reach the connector at the front of the blade (302). The strap (628), and corresponding straps on other blades, prevent the cables for different blades from mixing together.

Figure 10A:
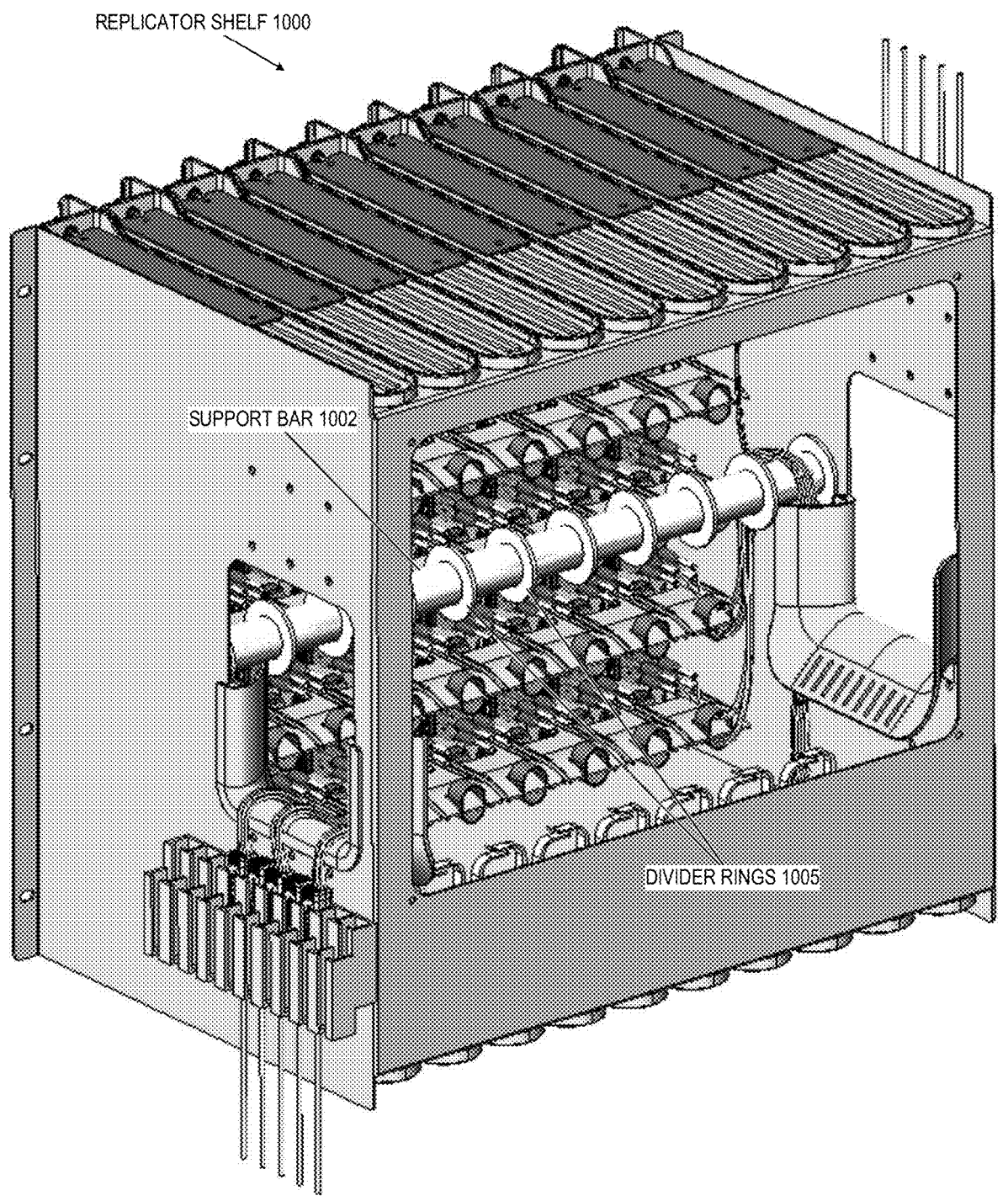

Turning to FIG. 10A, a perspective view of the replicator shelf (1000) is shown. The support bar (1002) includes the divider rings (1005), which segregates cables within the replicator shelf (1000). In one embodiment, the divider rings (1005) may segment the support bar (1002) into multiple sections with one section for each blade of the replicator shelf (1000).

Figure 10B:
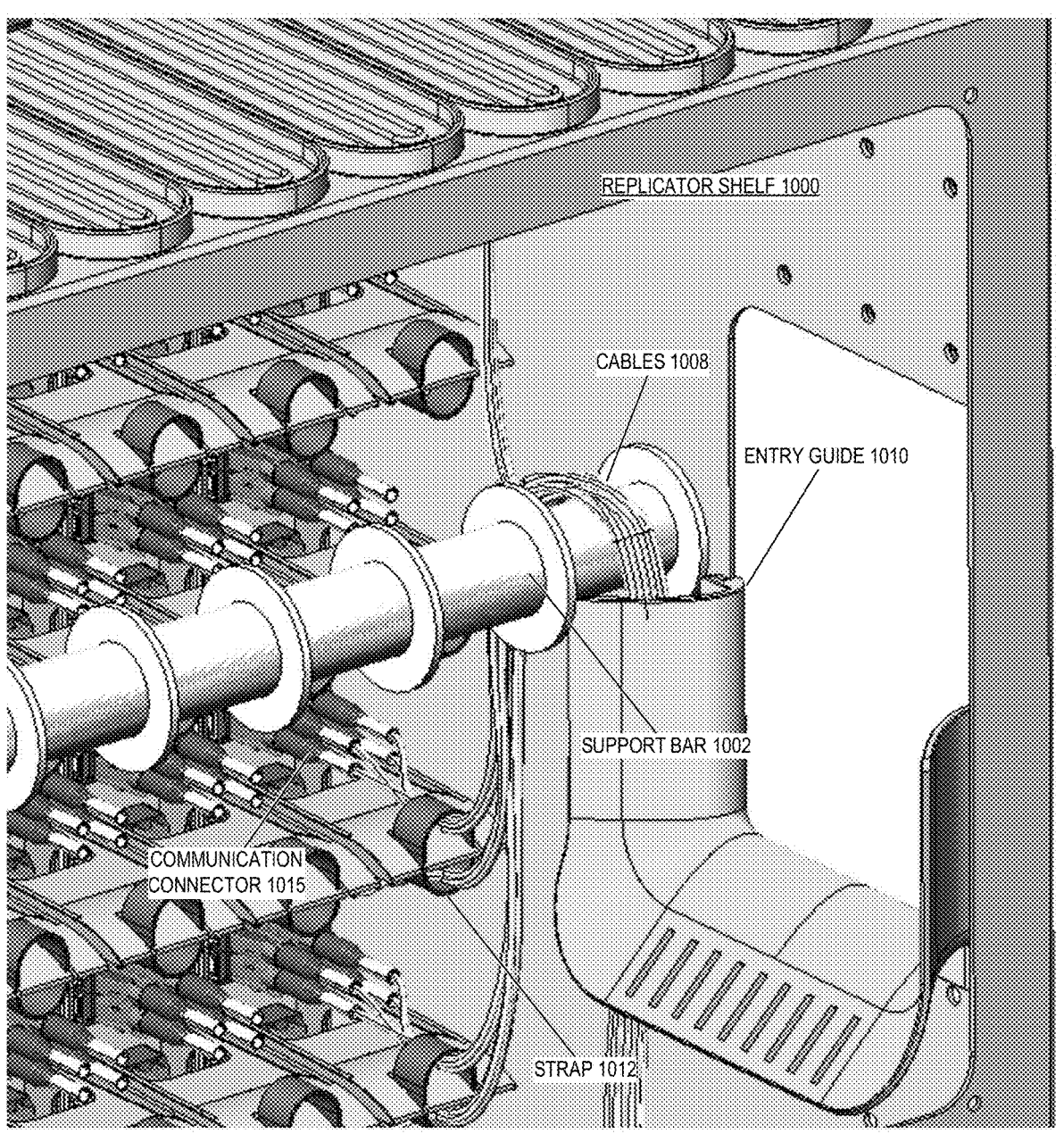

Turning to FIG. 10B, a zoomed in perspective view of the replicator shelf (1000) from FIG. 10A is shown. The cables (1008) are routed behind the entry guide (1010) over the support bar (1002), and through the strap (1012) to the communication connector (1015).

Figure 11A:
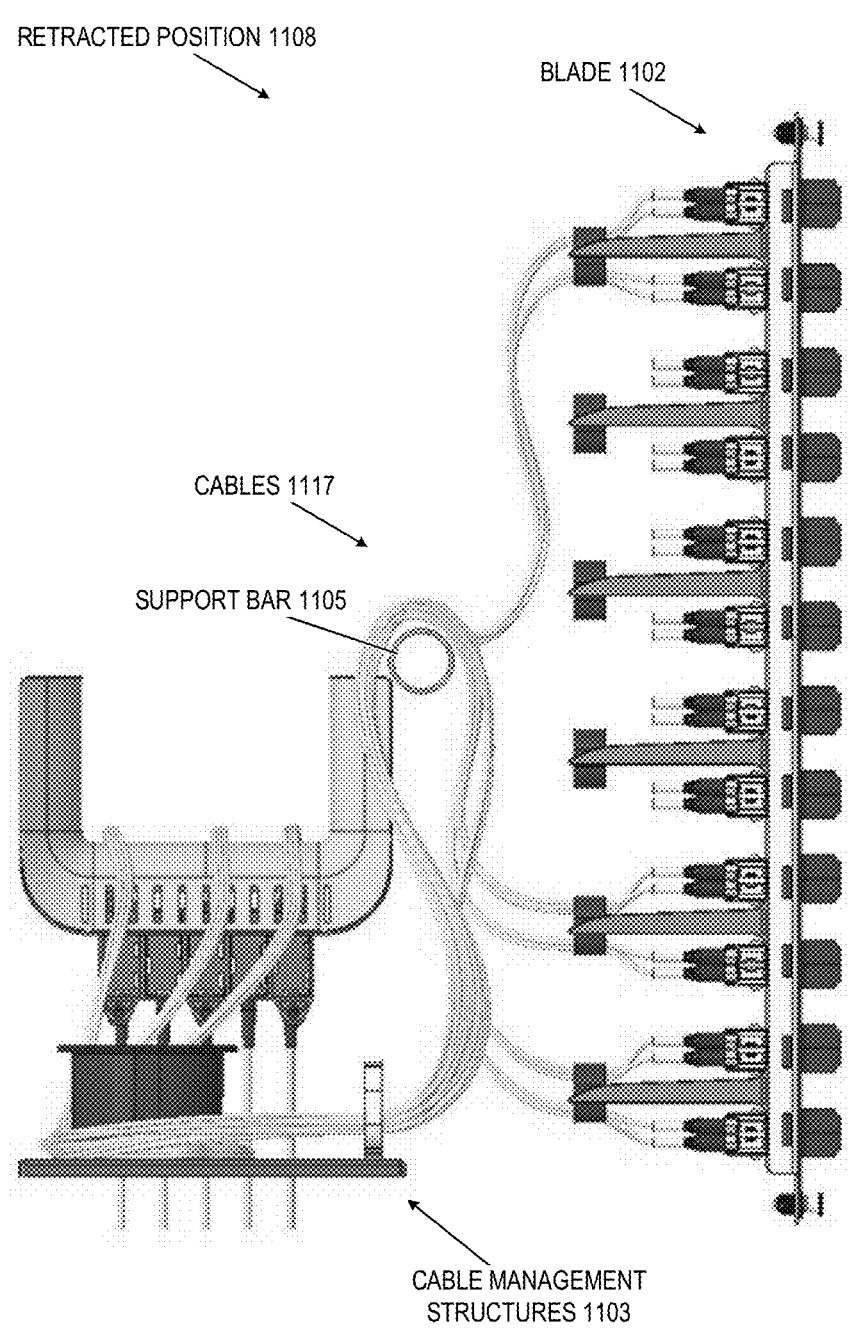

Turning to FIG. 11A, an interior of a replicator shelf is shown. The blade (1102) includes cables (1117) routed through cable management structures (1103) and over the support bar (1105). The blade (1102) is in the retracted position (1108).

Figure 11B:
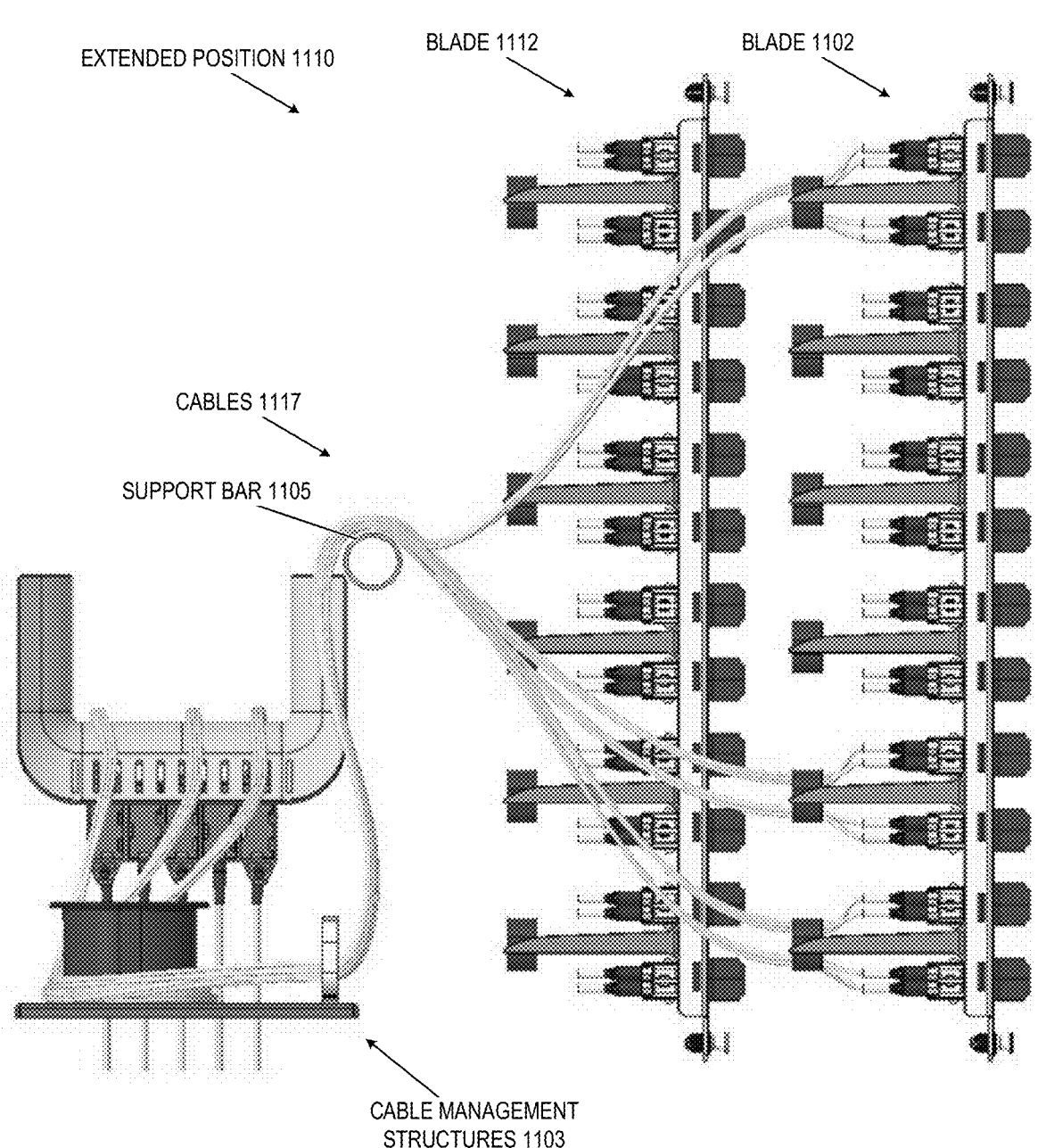

Turning to FIG. 11B, the interior of a replicator shelf is shown. The blade (1102) has been moved to the retracted position (1110) to provide access to the cables (1117) and connections of the blade (1102). Moving the blade (1102) reveals the blade (1112) in a retracted position. In one embodiment, the distance of the movement from the retracted position (1108) (of FIG. 11A) to the extended position (1110) is about five inches. The support bar (1105) may support the cables (1117) for the blade (1102) and cables for the blade (1112) in both retracted and extended positions. Use of the support bar (1105) prevents the cables (1117) from getting tangled in the cable management structures (1103).

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise. Further, unless expressly stated otherwise, the terms "about" or "substantially" may mean within a range of plus or minus ten percent.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:
1. An apparatus comprising:
a blade slidably connected to a replicator shelf;
a plurality of communication connectors positioned on the blade;
a support bar, within the replicator shelf, supporting a plurality of cables to a plurality of blades comprising the blade;
a magnetically backed label plate affixed to the blade;
a waterfall guide of the blade positioned between a pair of communication connectors of the plurality of communication connectors;

a strap within the waterfall guide securing a subset of cables, of the plurality of cables, to the waterfall guide between the support bar and the pair of communication connectors; and a slide mechanism, of the blade, limiting travel of the blade with respect to the replicator shelf.

2. The apparatus of claim 1, further comprising:
the replicator shelf, which comprises:
    the blade,
    a plurality of fiber management components, and
    a housing into which the plurality of fiber management components are mounted, wherein the blade slides with respect to the housing.

3. The apparatus of claim 1, further comprising:
a slide of the blade structured to fit to a slide roller connected to a housing of the replicator shelf fitted flush to an internal surface of the housing.

4. The apparatus of claim 1, further comprising:
a transition holder connected to a side of the replicator shelf and structured to secure a plurality of transition modules.

5. The apparatus of claim 1, further comprising:
a plurality of half spools structured to provide variable slack management of the plurality of cables within the replicator shelf.

6. The apparatus of claim 1, further comprising:
a cable entrance guide structured to slide in and snap to a housing of the replicator shelf.

7. The apparatus of claim 1, further comprising:
a plurality of divider rings of the support bar segregating the plurality of cables.

8. The apparatus of claim 1, further comprising:
the blade slidably connected to the replicator shelf between a retracted position and an extended position, wherein an extraction distance between the retracted position and the extended position is about five inches.

9. A system comprising:
a housing;
a blade slidably connected to the housing;
a plurality of communication connectors positioned on the blade;
a support bar, within the housing, supporting a plurality of cables to a plurality of blades comprising the blade;
a magnetically backed label plate affixed to the blade;
a waterfall guide of the blade positioned between a pair of communication connectors of the plurality of communication connectors;
a strap within the waterfall guide securing a subset of cables, of the plurality of cables, to the waterfall guide between the support bar and the pair of communication connectors; and
a slide mechanism, of the blade, limiting travel of the blade with respect to the housing.

10. The system of claim 9, further comprising:
a replicator shelf, which comprises:
    the blade, a plurality of fiber management components, and
    the housing into which the plurality of fiber management components are mounted, wherein the blade slides with respect to the housing.

11. The system of claim 9, further comprising:
a slide of the blade structured to fit to a slide roller connected to the housing of a replicator shelf fitted flush to an internal surface of the housing.

12. The system of claim 9, further comprising:
a transition holder connected to a side of a replicator shelf and structured to secure a plurality of transition modules.

13. The system of claim 9, further comprising:
a plurality of half spools structured to provide variable slack management of the plurality of cables within a replicator shelf.

14. The system of claim 9, further comprising:
a cable entrance guide structured to slide in and snap to the housing of a replicator shelf.

15. The system of claim 9, further comprising:
a plurality of divider rings of the support bar segregating a plurality of fibers.

16. A method comprising:
slidably connecting a blade to a replicator shelf;
positioning a plurality of communication connectors on the blade;
supporting, with a support bar within the replicator shelf, a plurality of fibers to a plurality of blades comprising the blade;
affixing a magnetically backed label plate to the blade;
positioning a waterfall guide of the blade between a pair of communication connectors of the plurality of communication connectors;
using a strap within the waterfall guide to secure a subset of cables, of a plurality of cables, to the waterfall guide between the support bar and the pair of communication connectors; and
using a slide mechanism, of the blade, to limit travel of the blade with respect to the replicator shelf.

17. The method of claim 16, further comprising:
structuring a slide of the blade to fit to a slide roller connected to a housing of the replicator shelf fitted flush to an internal surface of the housing.

18. The method of claim 16, further comprising:
connecting a transition holder to a side of the replicator shelf and structured to secure a plurality of transition modules.

19. The method of claim 16, further comprising:
structuring a plurality of half spools to provide variable slack management of the plurality of cables within the replicator shelf.

20. The method of claim 16, further comprising:
structuring a cable entrance guide to slide in and snap to a housing of the replicator shelf.

* * * * *